INVENTORS:
HANS EGLI,
WILTON E. PARKER,
BY
Attorney.

United States Patent Office 3,048,005
Patented Aug. 7, 1962

3,048,005
STARTING SYSTEM FOR ENGINES
Hans Egli, Santa Monica, and Wilton E. Parker, Encino, Calif., assignors to The Garrett Corporation, Los Angeles, Calif., a corporation of California
Filed June 25, 1959, Ser. No. 822,819
5 Claims. (Cl. 60—13)

This invention relates to systems for starting internal combustion engines, such as diesel engines, utilizing pneumatic motors detachably coupled to the engine crankshafts to drive the engines in the cranking or starting operation.

In the starting of internal combustion engines, such as diesel engines, under conditions of extreme cold, a high cranking torque is required due to the high viscosity of the cold oil film existing between moving parts. In addition to this high cranking torque, lower engine pressure may exist because of a lack of supercharging in a normally supercharged engine, and the normal electrical supply, such as batteries, operates at greatly lowered power output. According to the present invention it is proposed to drive the engine crankshaft in the cranking operation from a pneumatic motor such as a turbine, and at the same time, supply to the engine intake warm air from a supercharger to heat the high viscosity cold oil film and thus reduce the cranking torque, and also to increase the engine compression by supplying pressurized air. Under these conditions, not only is cranking torque and cranking time reduced, but ignition is facilitated.

It is therefore an object of this invention to provide a gas turbine starting system for internal combustion engines in which hot gases from the gas turbine are fed to the engine to warm it and to raise the pressure within the engine compression chamber, and also to drive a starting motor to crank the engine.

Another object of this invention is a starting system in accordance with the preceding objects in which the starting motor is fed by gas bled from the outlet of a combustion chamber supplied from an engine supercharger.

Another object of this invention is a starting system for internal combustion engines employing turbosuperchargers in which the supercharger is originally driven from an external power source to compress air feeding to a combustion chamber, and in which the combustion gases are fed to the driving turbine of the supercharger to continue supercharger action, with the feeding of the compressed air to the engine intake manifold, and in which a starting turbine for cranking the engine may be either a cold bleed turbine feeding from the intake manifold or a hot bleed turbine fed by gases bled from the combustion chamber outlet.

A still further object of the invention is a starting system in accordance with the preceding objects in which the starting turbine is, alternatively, fed in series with the supercharger turbine, for example from the exhaust therefrom.

Other objects and features of the invention will be readily apparent to those skilled in the art from this specification and the appended drawings illustrating a certain preferred embodiment in which.

Figure 1:
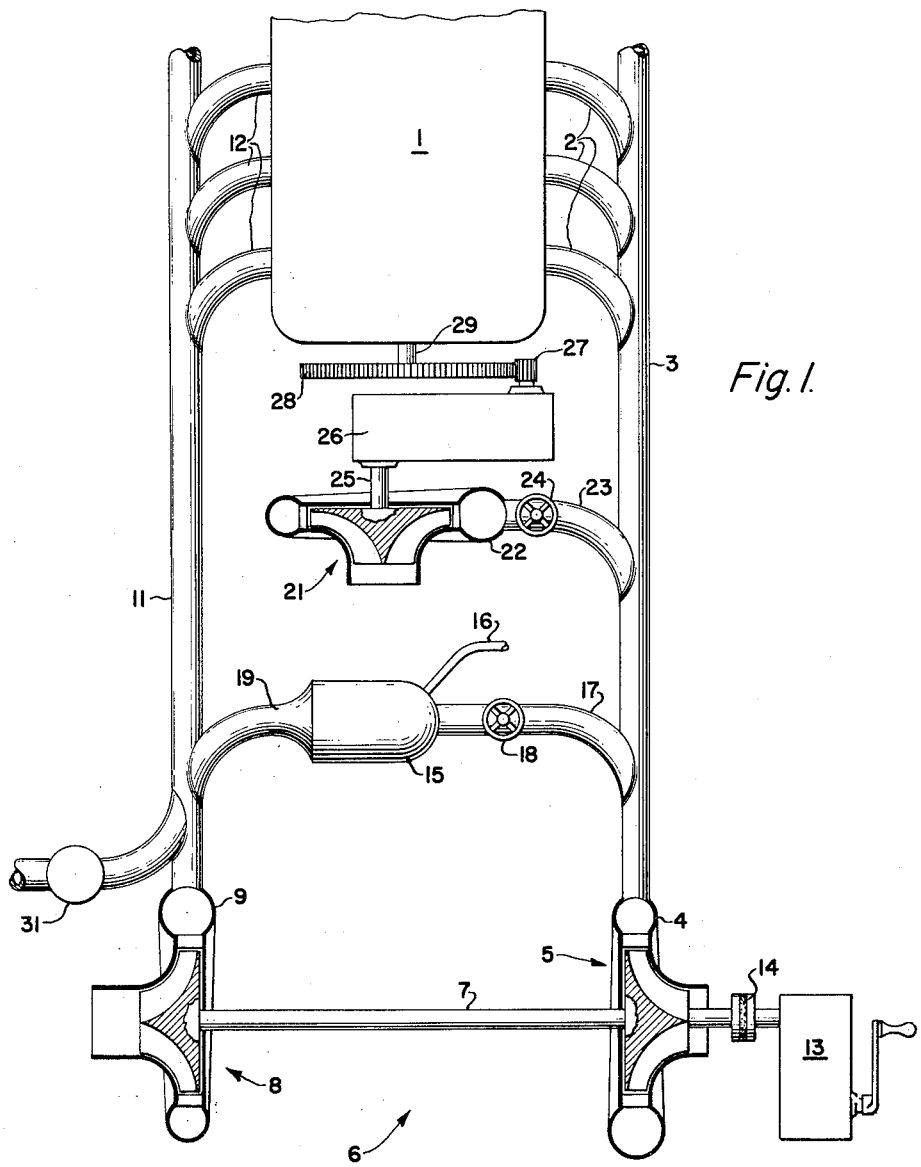
FIG. 1 is a schematic representation of one embodiment of a gas turbine starting system for an internal combustion engine according to the present invention.

The system shown in FIG. 1 includes a cylinder bank 1 of a conventional internal combustion engine (not completely illustrated) such as a diesel engine having intake ducts 2 connected to an intake manifold 3 fed from the outlet scroll 4 of a compressor 5 of a turbosupercharger (hereinafter called turbocharger) 6. The compressor 5 is driven by a shaft 7 connected to the turbocharger turbine 8 whose inlet scroll 9 is connected to the exhaust manifold 11 fed by ducts 12 leading from the exhaust ports of the cylinder bank 1. The manifolds 3 and 11 can be considered as a manifold system connected to the cylinder bank 1.

A starting means is schematically illustrated at 13 as a manually operated device which is connected by a suitable clutch 14 to the drive shaft 7 of the turbocharger 6. It will be understood that the manual device 13 is shown for simplicity only, and that the starting means may be electrically as well as pneumatically driven, and while no details of the clutch 14 are shown, it is understood that this is a conventional clutch which may be a mechanically, electrically, or pneumatically controlled device to engage the starting means with the turbocharger shaft only during the initial starting operation.

A combustion chamber 15 having a controlled fuel inlet 16 is connected to the intake manifold 3 through a duct 17 in which there is an on and off control valve 18. The outlet of the combustion chamber 15 is connected through the duct 19 to the exhaust manifold 11.

In the embodiment of the invention specifically illustrated in FIG. 1 of the drawing, a pneumatic turbine 21 has its inlet scroll 22 connected to the intake manifold 3 by a duct 23 in which is disposed an on and off control valve 24. The turbine shaft 25 is connected through reduction gearing 26 to drive a pinion 27 meshing with a flywheel gear 28 on the engine crankshaft 29. It will again be understood that the pinion 27 is meshed with the flywheel gear 28 only during the starting operation, and is disconnected therefrom once ignition takes place and the engine is operating under its own power. Such starter drive disconnects are conventional in the internal combustion field. The valves 18 and 24 may be operated mechanically, electrically or pneumatically in the desired operating sequence to be hereinafter set forth.

By-passing the turbocharger turbine 8 is a spill valve 31, boost pressure controlled to maintain a constant manifold pressure over a range of operation of the engine. This control is facilitated by the selection of a small nozzle area for the turbocharger turbine 8.

Operation of the system in starting the engine from rest will now be set forth. Valve 24 is closed, valve 18 is opened, and starting means 13 is operated to effect rotation of the turbocharger through the now engaged clutch 14. Compressed air from the outlet of the turbocharger compressor 5 is thus fed into the combustion chamber 15 and automatic control injects fuels from inlet 16 into the combustion chamber where it is ignited and the products of combustion fed through duct 19 and exhaust manifold 11 to the turbine 8 of the turbocharger which now accelerates. The starting means 13 is now de-energized from the turbocharger at clutch 14. The turbocharger continues to accelerate until it reaches full speed rating and the boost pressure control valve 31 modulates to maintain the intake manifold pressure for which it is set. The starter turbine 21 is now energized by opening valve 24, and pinion 27 is engaged with the flywheel gear 28 to initiate cranking of the engine.

During cranking, compressed air will flow from the intake manifold through the intake ducts 2 into the cylinder bank 1 under the full manifold pressure and temperature, thus warming up the oil film on the cylinder liners with a corresponding reduction in engine cranking friction. Fuel is now injected into the cylinders of the engine and ignition is facilitated by the fact that operation is under full compression from full manifold pressure and temperature. After the engine starts to operate under its own power, valves 18 and 24 are closed and the fuel supply at 16 is stopped. The pinion 27 is also disconnected from the flywheel gear 28 either automatically or under controlled disconnection depending upon the arrangement utilized.

In the cranking and starting cycle, it may be desired to utilize heat of the exhaust gases from the turbines to assist in warming up the engine.

Figure 2:
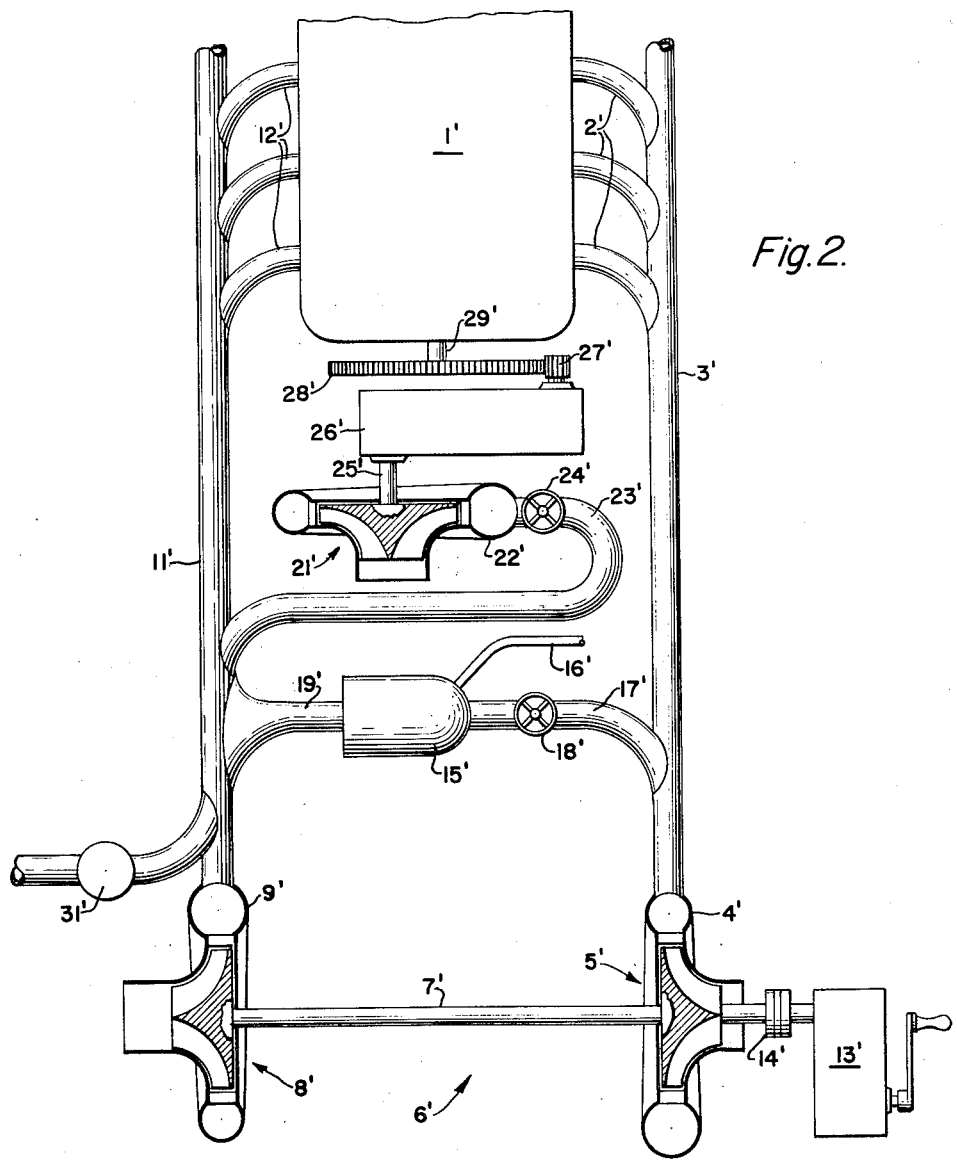
FIG. 2 is a schematic representation of another embodiment of a gas turbine starting system for an internal combustion engine according to the present invention.

In FIG. 2 of the drawings is shown an embodiment of the invention which utilizes the same essential parts as the embodiment of the invention illustrated in FIG. 1 of the drawings. For convenience of illustration and explanation the various parts utilized in the embodiment of the invention shown in FIG. 2 are not separately designated herein, and are shown in the accompanying drawings and are described in the remainder of this specification by the primes of the numbers previously used to designate corresponding parts illustrated in FIG. 1.

The embodiment of the invention shown in FIG. 2 differs from the embodiment of the invention shown in FIG. 1 in that the exhaust duct 23' used to supply gas to the starter turbine 21' is connected directly to the exhaust manifold 11' so as to bleed into this turbine hot combustion gas from the chamber 15' during a starting operation. Thus, with the modified structure shown in FIG. 2 the gases derived to start the turbine 21' are obtained from the exhaust manifold 11' instead of from the intake manifold 3'. The embodiment of the invention illustrated in FIG. 2 may be used where hot combustion gases are needed in order to supply a comparatively great power output when such a power output for the starter turbine shown is necessary in order to crank an engine as it is started.

While the schematic diagrams in FIGS. 1 and 2 show a single bank of cylinders, it will be understood that the starting system is equally suitable to any number of cylinder banks, and employing any number of turbochargers. Under the latter condition, the starting turbine could be fed from a single turbocharger or from a plurality of turbochargers in accordance with the power requirements and bleed supply for the turbine.

In the various operations previously described, the starting turbine has been operated in parallel with the drive turbine 8 of the turbocharger 6, but the use of the starting turbine in a series arrangement with the turbocharger turbine is quite possible. For example, the starting turbine could be arranged at the discharge end of the turbocharger driving turbine. However, in this arrangement relatively large ducts and valves would be required since the starting turbine would be required to handle the full flow rate of the turbocharger turbine.

While the starting turbine 21 is shown as mechanically connecting to the engine crankshaft it will be understood that this coupling may be an electrical or hydraulic drive or driven in any other desired manner.

While certain preferred embodiments of the invention have been specifically disclosed, it is understood that the invention is not limited thereto, as many variations will be readily apparent to those skilled in the art and the invention is to be given its broadest possible interpretation consistent with the prior art.

What is claimed is:

1. An apparatus for starting an internal combustion engine having a manifold system including an intake manifold and an exhaust manifold, a crankshaft, and requiring a high cranking torque, said apparatus comprising: compressor means for supplying oxidant bearing gas to said intake manifold; turbine means for actuating said compressor means, said turbine means being operatively connected with said exhaust manifold so as to receive gas from said exhaust manifold and being operatively connected to said compressor means; pneumatic motor means for rotating said crankshaft in order to start said engine; conduit means branching from said manifold system and extending to said pneumatic motor means for supplying gas thereto to cause its actuation; combustion means connected to the intake manifold so as to receive therefrom oxidant bearing gas for combustion, said combustion means being connected to said exhaust manifold so as to supply exhaust gases to said exhaust manifold, starting means for actuating said compressor means in order to start said engine; first valve means for controlling the flow of gas passing through said conduit means branching from said manifold system to said pneumatic motor means; and second valve means for controlling the pressure of exhaust gas within said exhaust manifold means; said first valve means, when opened to admit gas to said pneumatic motor means, causing said pneumatic motor means to impose a cranking torque on said crankshaft without imposing an increase in torque load on said operatively connected compressor means and turbine means.

2. A combination as defined in claim 1 wherein said conduit means is branch connected to the intake manifold of said manifold system.

3. A combination as defined in claim 1 wherein said conduit means is branch connected to an exhaust manifold of said manifold system.

4. In combination: a cylinder bank of an engine, said engine having cranking means and requiring a high cranking torque when cold; intake manifold means for conveying compressed air to said cylinder bank, said intake manifold means being operatively connected to said cylinder bank; exhaust manifold means for conveying exhaust gases from said cylinder bank, said exhaust manifold means being operatively connected to said cylinder bank; compressor means for supplying compressed air to said cylinder bank, said compressor means being operatively connected to said intake manifold means; starting means for initially driving said compressor means; turbine means for operating said compressor means after starting thereof by said starting means, said turbine means being operatively connected to said exhaust manifold means so as to receive gas from said exhaust manifold means, said turbine means also being operatively connected to said compressor means so as to be capable of actuating said compressor means; combustion means for supplying exhaust gases to said exhaust manifold means, said combustion means being operatively connected to said intake manifold means so as to receive compressed air from said intake manifold means, said combustion means also being operatively connected to said exhaust manifold means so as to supply exhaust gas to said exhaust manifold means; valve means for controlling the flow of air to said combustion means from said intake manifold means; other valve means for controlling the pressure of exhaust gas within said exhaust manifold means; pneumatic motor means for actuating said engine cranking means in order to start said engine; conduit means branching from said intake manifold means and extending to said pneumatic motor means for supplying compressed air thereto; mechanical means for transmitting power from said motor means to said engine cranking means, said mechanical means being operatively connected to said motor means and said engine cracking means; and further valve means for controlling the flow of compressed air to said motor means through said conduit means; said further valve means, when opened to admit compressed air to said pneumatic motor means, causing said pneumatic motor means to impose a cranking torque on said engine cranking means without imposing an increase in torque load on said operatively connected compressor means and turbine means.

5. In combination: a cylinder bank of an engine, said engine having a cranking means and requiring a high cranking torque when cold; intake manifold means for conveying compressed air to said cylinder bank, said intake manifold means being operatively connected to said cylinder bank; exhaust manifold means for conveying exhaust gases from said cylinder bank, said exhaust manifold means being operatively connected to said cylinder bank; compressor means for supplying compressed air to said cylinder bank, said compressor means being operatively connected to said intake manifold means; starting means for initially driving said compressor means; turbine means for operating said compressor means after starting thereof by said starting means, said turbine means being operatively connected to said exhaust manifold means so as to receive gas from said exhaust manifold means, said turbine means also being operatively connected to said compressor means so as to be capable of actuating said compressor means; combustion means for supplying exhaust gases to said exhaust manifold means, said combustion means being operatively connected to said intake manifold means so as to receive compressed air from said intake manifold means, said combustion means also being operatively connected to said exhaust manifold means so as to supply exhaust gas to said exhaust manifold means; valve means for controlling the flow of air to said combustion means from said intake manifold means; other valve means for controlling the pressure of exhaust gas within said exhaust manifold means; pneumatic motor means for actuating said engine cranking means in order to start said engine; conduit means branching from said exhaust manifold means and extending to said pneumatic motor means for supplying exhaust gas thereto; mechanical means for transmitting power from said motor means to said engine cranking means, said mechanical means being operatively connected to said motor means and said engine cranking means; and further valve means for controlling the flow of exhaust gas to said motor means through said conduit means; said further valve means, when opened to admit exhaust gas to said pneumatic motor means, causing said pneumatic motor means to impose a cranking torque on said engine cranking means without imposing an increase in torque load on said operatively connected compressor means and turbine means.

References Cited in the file of this patent

UNITED STATES PATENTS

| | | |
|---|---|---|
| 2,199,259 | Herset | Apr. 30, 1940 |
| 2,503,289 | Nettel | Apr. 11, 1950 |
| 2,559,623 | Holmes | July 10, 1951 |
| 2,585,029 | Nettel | Feb. 12, 1952 |
| 2,775,894 | Troeger et al. | Jan. 1, 1957 |
| 2,806,351 | Kent et al. | Sept. 17, 1957 |
| 2,840,987 | Bloomberg et al. | July 1, 1958 |
| 2,994,194 | Volk | Aug. 1, 1961 |

UNITED STATES PATENT OFFICE
CERTIFICATE OF CORRECTION

Patent No. 3,048,005                          August 7, 1962

Hans Egli et al.

It is hereby certified that error appears in the above numbered patent requiring correction and that the said Letters Patent should read as corrected below.

Column 4, line 61, for "cracking" read -- cranking --.

Signed and sealed this 11th day of December 1962.

(SEAL)
Attest:

ERNEST W. SWIDER
Attesting Officer

DAVID L. LADD
Commissioner of Patents